US009269367B2

(12) United States Patent
Strömmer et al.

(10) Patent No.: US 9,269,367 B2
(45) Date of Patent: Feb. 23, 2016

(54) PROCESSING AUDIO SIGNALS DURING A COMMUNICATION EVENT

(75) Inventors: Stefan Strömmer, Stockholm (SE); Karsten Vandborg Sørensen, Stockholm (SE)

(73) Assignee: Skype Limited, Dublin (IE)

( * ) Notice: Subject to any disclaimer, the term of this patent is extended or adjusted under 35 U.S.C. 154(b) by 212 days.

(21) Appl. No.: 13/212,688

(22) Filed: Aug. 18, 2011

(65) Prior Publication Data

US 2013/0013303 A1 Jan. 10, 2013

(30) Foreign Application Priority Data

Jul. 5, 2011 (GB) .................................. 1111474.1

(51) Int. Cl.
*H04B 15/00* (2006.01)
*G10L 21/02* (2013.01)
*G10L 21/0208* (2013.01)
*G10L 21/0216* (2013.01)

(52) U.S. Cl.
CPC ............. *G10L 21/02* (2013.01); *G10L 21/0208* (2013.01); *G10L 2021/02166* (2013.01)

(58) Field of Classification Search
CPC ............... H04B 7/086; H04R 2203/12; H04R 2430/23; H04R 3/005; G10L 2021/02166; G20K 2210/10; G20K 2210/3215
USPC ........................................................ 381/94.7
See application file for complete search history.

(56) References Cited

U.S. PATENT DOCUMENTS 4,849,764 A 7/1989 van Heyningen
5,208,864 A 5/1993 Kaneda
5,524,059 A 6/1996 Zurcher
6,157,403 A 12/2000 Nagata
6,232,918 B1 5/2001 Wax et al.

(Continued)

FOREIGN PATENT DOCUMENTS

CA 2413217 5/2004
CN 100446530 3/2001

(Continued)

OTHER PUBLICATIONS

Knapp, Charles H., and G. Clifford Carter. "The Generalized Correlation Method for Estimation of Time Delay." IEEE Transactions on Acoustics, Speech and Signal Processing 24.4 (1976): 320-27. Web. Oct. 31, 2013.*

(Continued)

*Primary Examiner* — Joseph Saunders, Jr.
*Assistant Examiner* — James Mooney
(74) *Attorney, Agent, or Firm* — Danielle Johnston Holmes; Micky Minhas; Wolfe-SBMC

(57) ABSTRACT

A method of processing audio signals during a communication session between a user device and a remote node, includes receiving a plurality of audio signals at audio input means at the user device including at least one primary audio signal and unwanted signals and receiving direction of arrival information of the audio signals at a noise suppression means. Known direction of arrival information representative of at least some of said unwanted signals is provided to the noise suppression means and the audio signals are processed at the noise suppression means to treat as noise, portions of the signal identified as unwanted dependent on a comparison between the direction of arrival information of the audio signals and the known direction of arrival information.

25 Claims, 5 Drawing Sheets

(56) References Cited

U.S. PATENT DOCUMENTS

| | | | |
|---|---|---|---|
| 6,339,758 | B1 | 1/2002 | Kanazawa et al. |
| 6,914,854 | B1 | 7/2005 | Heberley et al. |
| 8,249,862 | B1 | 8/2012 | Cheng et al. |
| 8,325,952 | B2 | 12/2012 | Cho |
| 8,401,178 | B2 | 3/2013 | Chen et al. |
| 8,620,388 | B2 | 12/2013 | Hayakawa et al. |
| 8,824,693 | B2 | 9/2014 | Ahgren |
| 8,891,785 | B2 | 11/2014 | Sorensen |
| 8,981,994 | B2 | 3/2015 | Sorensen |
| 9,031,257 | B2 | 5/2015 | Sorensen et al. |
| 9,042,573 | B2 | 5/2015 | Sorensen |
| 9,042,574 | B2 | 5/2015 | Sorensen |
| 9,042,575 | B2 | 5/2015 | Sorensen |
| 9,111,543 | B2 | 8/2015 | Ahgren |
| 9,210,504 | B2 | 12/2015 | Sorensen |
| 2002/0015500 | A1 | 2/2002 | Belt et al. |
| 2002/0103619 | A1 | 8/2002 | Bizjak |
| 2002/0171580 | A1 | 11/2002 | Gaus et al. |
| 2004/0125942 | A1 | 7/2004 | Beaucoup et al. |
| 2004/0213419 | A1* | 10/2004 | Varma et al. .................... 381/92 |
| 2005/0149339 | A1 | 7/2005 | Tanaka et al. |
| 2005/0216258 | A1 | 9/2005 | Kobayashi et al. |
| 2005/0232441 | A1 | 10/2005 | Beaucoup et al. |
| 2006/0015331 | A1 | 1/2006 | Hui et al. |
| 2006/0031067 | A1 | 2/2006 | Kaminuma |
| 2006/0133622 | A1 | 6/2006 | Chen |
| 2006/0153360 | A1 | 7/2006 | Kellermann |
| 2006/0269073 | A1 | 11/2006 | Mao |
| 2007/0003078 | A1 | 1/2007 | Escott et al. |
| 2007/0164902 | A1 | 7/2007 | Bang et al. |
| 2008/0039146 | A1 | 2/2008 | Jin |
| 2008/0199025 | A1 | 8/2008 | Amada |
| 2008/0232607 | A1* | 9/2008 | Tashev et al. .............. 381/71.11 |
| 2008/0260175 | A1 | 10/2008 | Elko |
| 2009/0010453 | A1 | 1/2009 | Zurek et al. |
| 2009/0076810 | A1 | 3/2009 | Matsuo |
| 2009/0076815 | A1 | 3/2009 | Ichikawa et al. |
| 2009/0125305 | A1* | 5/2009 | Cho .............................. 704/233 |
| 2009/0274318 | A1 | 11/2009 | Ishibashi et al. |
| 2009/0304211 | A1 | 12/2009 | Tashev et al. |
| 2010/0014690 | A1 | 1/2010 | Wolff et al. |
| 2010/0027810 | A1 | 2/2010 | Marton |
| 2010/0070274 | A1* | 3/2010 | Cho et al. ...................... 704/233 |
| 2010/0081487 | A1 | 4/2010 | Chen et al. |
| 2010/0103776 | A1* | 4/2010 | Chan ............................. 367/119 |
| 2010/0128892 | A1 | 5/2010 | Chen et al. |
| 2010/0150364 | A1 | 6/2010 | Buck et al. |
| 2010/0177908 | A1 | 7/2010 | Seltzer et al. |
| 2010/0215184 | A1 | 8/2010 | Buck et al. |
| 2010/0217590 | A1 | 8/2010 | Nemer et al. |
| 2010/0246844 | A1 | 9/2010 | Wolff et al. |
| 2010/0296665 | A1* | 11/2010 | Ishikawa et al. ............. 381/71.1 |
| 2010/0315905 | A1 | 12/2010 | Lee et al. |
| 2010/0323652 | A1 | 12/2010 | Visser et al. |
| 2011/0038486 | A1 | 2/2011 | Beaucoup |
| 2011/0038489 | A1 | 2/2011 | Visser et al. |
| 2011/0054891 | A1 | 3/2011 | Vitte et al. |
| 2011/0070926 | A1* | 3/2011 | Vitte et al. ................. 455/569.2 |
| 2011/0158418 | A1 | 6/2011 | Bai et al. |
| 2011/0178798 | A1 | 7/2011 | Flaks et al. |
| 2012/0182429 | A1* | 7/2012 | Forutanpour et al. ......... 348/175 |
| 2012/0303363 | A1 | 11/2012 | Sorensen |
| 2013/0034241 | A1 | 2/2013 | Pandey et al. |
| 2013/0082875 | A1 | 4/2013 | Sorensen |
| 2013/0083832 | A1 | 4/2013 | Sorensen |
| 2013/0083934 | A1 | 4/2013 | Åhgren |
| 2013/0083936 | A1 | 4/2013 | Sorensen |
| 2013/0083942 | A1 | 4/2013 | Åhgren et al. |
| 2013/0083943 | A1 | 4/2013 | Sorensen et al. |
| 2013/0129100 | A1 | 5/2013 | Sorensen |
| 2013/0136274 | A1 | 5/2013 | Åhgren |
| 2013/0148821 | A1 | 6/2013 | Sorensen |

FOREIGN PATENT DOCUMENTS

| | | |
|---|---|---|
| CN | 1406066 | 3/2003 |
| CN | 1698395 | 11/2005 |
| CN | 1809105 | 7/2006 |
| CN | 1815918 | 8/2006 |
| CN | 1835416 | 9/2006 |
| CN | 1885848 | 12/2006 |
| CN | 101015001 | 8/2007 |
| CN | 101018245 | 8/2007 |
| CN | 101207663 | 6/2008 |
| CN | 100407594 | 7/2008 |
| CN | 101278596 | 10/2008 |
| CN | 101455093 | 6/2009 |
| CN | 101625871 | 1/2010 |
| CN | 101667426 | 3/2010 |
| CN | 101685638 | 3/2010 |
| CN | 101828410 | 9/2010 |
| CN | 102111697 | 6/2011 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 1930880 | 6/2008 |
| EP | 2026329 | 2/2009 |
| EP | 2159791 | 3/2010 |
| EP | 2175446 | 4/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| TW | 201123175 | 7/2011 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO -2008062854 | 5/2008 |
| WO | WO-2010098546 | 9/2010 |
| WO | WO-2012097314 | 7/2012 |

OTHER PUBLICATIONS

"Search Report", GB Application No. 1108885.3, (Sep. 3, 2012), 3 pages.
"Search Report", GB Application No. 1111474.1, (Oct. 24, 2012), 3 pages.
"Search Report", GB Application No. 1116847.3, (Dec. 20, 2012), 3 pages.
"Search Report", Application No. GB1116846.5, Jan. 28, 2013, 3 pages.
"Search Report", GB Application No. 1116840.8, Jan. 29, 2013, 3 pages.
"Search Report", GB Application No. 1116843.2, Jan. 30, 2013, 3 pages.
"Search Report", GB Application No. 1116869.7, Feb. 7, 2013, 3 pages.
"Search Report", GB Application No. 1121147.1, Feb. 14, 2013, 5 pages.
"Uk Search Report", UK Application No. GB1116848.1, Dec. 18, 2012, 3 pages.
"PCT Search Report and Written Opinion", Application No. PCT/US2012/2065737, (Feb. 13, 2013), 12 pages.
"PCT Search Report and Written Opinion", Application No. PCT/US/2012/045556, (Jan. 2, 2013), 10 pages.
"International Search Report and Written Opinion", Application No. PCT/US2012/058146, (Jan. 21, 2013), 9 pages.
"International Search Report and Written Opinion", Application No. PCT/2012/066485, (Feb. 15, 2013), 12 pages.
"PCT Search Report and Written Opinion", Application No. PCT/US2012/068649, (Mar. 7, 2013),9 pages.

(56) References Cited

OTHER PUBLICATIONS

"PCT Search Report and Written Opinion", Application No. PCT/US2012/058145, (Apr. 24, 2013),18 pages.
"PCT Search Report and Written Opinion", Application No. PCT/US2012/058148, (May 3, 2013),9 pages.
"PCT Search Report and Written Opinion", Application No. PCT/US2012/058147, (May 8, 2013),9 pages.
"PCT Search Report and Written Opinion", Application No. PCT/US2012/058143, (Dec. 21, 2012),12 pages.
Goldberg, et al., "Joint Direction-of-Arrival and Array Shape Tracking for Multiple Moving Targets", IEEE *International Conferene on Acoustics, Speech, and Signal Processing*, (Apr. 21, 1997), pp. 511-514.
GRBIC, Nedelko et al., "Soft Constrained Subband Beamforming for Hands-Free Speech Speech Enhancement", *In Proceedings of ICASSP 2002*, (May 13, 2002),4 pages.
Handzel, et al., "Biomimetic Sound-Source Localization", *IEEE Sensors Journal*, vol. 2, No. 6, (Dec. 2002), pp. 607-616.
Kellerman, W. "Strategies for Combining Acoustic Echo Cancellation and Adaptive Beamforming Microphone Arrays", *In Proceedings of ICASSP 1997*, (Apr. 1997), pp. 219-222.
"Non-Final Office Action", U.S. Appl. No. 13/307,852, Feb. 20, 2014, 5 pages.
"Foreign Office Action", CN Application No. 201210368101.5, Dec. 6, 2013, 9 pages.
"Non-Final Office Action", U.S. Appl. No. 13/341,610, Dec. 27, 2013, 10 pages.
"International Search Report and Written Opinion", Application No. PCT/US2013/058144, Sep. 11, 2013, 10 pages.
"Non-Final Office Action", Application No. 13/307,994, Dec. 19, 2013, 12 pages.
"Non-Final Office Action", U.S. Appl. No. 13/212,633, Nov. 1, 2013, 14 pages.
"Search Report", GB Application No. 1119932.0, Feb. 28, 2013, 8 pages.
"Foreign Office Action", CN Application No. 201210377130.8, Jan. 15, 2014, 12 pages.
"International Search Report and Written Opinion", Application No. PCT/EP2012/059937, Feb. 14, 2014, 9 pages.
"Non-Final Office Action", U.S. Appl. No. 13/327,308, Mar. 28, 2014, 13 pages.
"Notice of Allowance", U.S. Appl. No. 13/307,994, Apr. 1, 2014, 7 pages.
"Foreign Office Action", CN Application No. 201210377115.3, Aug. 27, 2014, 18 pages.
"Foreign Office Action", CN Application No. 201210377130.8, Sep. 28, 2014, 7 pages.
"Foreign Office Action", CN Application No. 201210485807.X, Oct. 8, 2014, 10 pages.
"Foreign Office Action", CN Application No. 201210521742.X, Oct. 8, 2014, 16 pages.
"Supplemental Notice of Allowance", U.S. Appl. No. 13/307,852, Oct. 22, 2014, 2 pages.
Goldberg, et al., "Joint Direction-of-Arrival and Array-Shape Tracking for Multiple Moving Targets", IEEE International Conference on Acoustic, Speech, and Signal Processing, Apr. 25, 1997, 4 pages.
"Foreign Office Action", CN Application No. 201210367888.3, Jul. 15, 2014, 13 pages.
"Foreign Office Action", CN Application No. 201210368101.5, Jun. 20, 2014, 7 pages.
"Foreign Office Action", CN Application No. 201210377215.6, Mar. 24, 2014, 16 pages.
"Foreign Office Action", CN Application No. 201210462710.7, Mar. 5, 2014, 12 pages.
"Non-Final Office Action", U.S. Appl. No. 13/308,210, Aug. 18, 2014, 6 pages.
"Non-Final Office Action", U.S. Appl. No. 13/327,250, Sep. 15, 2014, 10 pages.
"Notice of Allowance", U.S. Appl. No. 13/307,852, Sep. 12, 2014, 4 pages.
"Corrected Notice of Allowance", U.S. Appl. No. 13/307,852, Dec. 18, 2014, 2 pages.
"Final Office Action", U.S. Appl. No. 13/327,308, Dec. 2, 2014, 6 pages.
"Foreign Office Action", CN Application No. 201280043129.X, Dec. 17, 2014, 8 pages.
"Foreign Office Action", GB Application No. 1121147.1, Apr. 25, 2014, 2 pages.
"Non-Final Office Action", U.S. Appl. No. 13/212,633, Nov. 28, 2014, 16 pages.
"Notice of Allowance", U.S. Appl. No. 13/308,165, Dec. 23, 2014, 7 pages.
"Notice of Allowance", U.S. Appl. 13/308,210, Dec. 16, 2014, 6 pages.
"Notice of Allowance", U.S. Appl. No. 13/327,250, Jan. 5, 2015, 9 pages.
"Notice of Allowance", U.S. Appl. No. 13/341,610, Dec. 26, 2014, 8 pages.
"Notification of Grant", CN Application No. 201210368224.9, Jan. 6, 2015, 3 pages.
"Notification of Grant", CN Application No. 201210377130.8, Jan. 17, 2015, 3 pages.
"Notification of Grant", CN Application No. 201210462710.7, Jan. 6, 2015, 6 pages.
"Corrected Notice of Allowance", U.S. Appl. No. 13/307,994, Jun. 24, 2014, 2 pages.
"Final Office Action", U.S. Appl. No. 13/212,633, May 23, 2014, 16 pages.
"Final Office Action", U.S. Appl. No. 13/341,610, Jul. 17, 2014, 7 pages.
"Foreign Office Action", CN Application No. 201210368224.9, Jun. 5, 2014, 11 pages.
"Non-Final Office Action", U.S. Appl. No. 13/307,852, May 16, 2014, 4 pages.
"Non-Final Office Action", U.S. Appl. No. 13/308,165, Jul. 17, 2014, 14 pages.
"Notice of Allowance", U.S. Appl. No. 13/308,106, Jun. 27, 2014, 7 pages.
"Supplemental Notice of Allowance", U.S. Appl. No. 13/307,994, Aug. 8, 2014, 2 pages.
"Corrected Notice of Allowance", U.S. Appl. No. 13/307,852, Feb. 20, 2015, 2 pages.
"Corrected Notice of Allowance", U.S. Appl. No. 13/308,165, Feb. 17, 2015, 2 pages.
"Corrected Notice of Allowance", U.S. Appl. No. 13/308,210, Feb. 17, 2015, 2 pages.
"Final Office Action", U.S. Appl. No. 13/212,633, May 21, 2015, 16 pages.
"Foreign Office Action", CN Application No. 201210377115.3, Apr. 23, 2015, 12 pages.
"Foreign Office Action", CN Application No. 201210377215.6, Jan. 23, 2015, 11 pages.
"Foreign Office Action", EP Application No. 12784776.2, Jan. 30, 2015, 6 pages.
"Foreign Office Action", EP Application No. 12809381.2, Feb. 9, 2015, 8 pages.
"Foreign Office Action", EP Application No. 12878205.9, Feb. 9, 2015, 6 pages.
"Non-Final Office Action", U.S. Appl. No. 13/341,607, Mar. 27, 2015, 10 pages.
"Notice of Allowance", U.S. Appl. No. 13/327,308, Apr. 13, 2015, 6 pages.
"Foreign Office Action", CN Application No. 201210485807.X, Jun. 15, 2015, 7 pages.
"Notice of Allowance", U.S. Appl. No. 13/341,607, Aug. 14, 2015, 6 pages.
"Summons to Attend Oral Proceedings", EP Application No. 12878205.9, Jul. 21, 2015, 5 pages.
"Foreign Office Action", EP Application No. 12741416.7, Sep. 23, 2015, 4 pages.
"Summons to Attend Oral Proceedings", EP Application No. 12809381.2, Oct. 13, 2015, 8 pages.

(56) References Cited

OTHER PUBLICATIONS

"Supplemental Notice of Allowance", Application No. 13/341,607, Nov. 5, 2015, 2 pages.

* cited by examiner

PROCESSING AUDIO SIGNALS DURING A COMMUNICATION EVENT

RELATED APPLICATION

This application claims priority under 35 U.S.C. §119 or 365 to Great Britain Application No. GB 1111474.1, filed Jul. 5, 2011. The entire teachings of the above application are incorporated herein by reference.

TECHNICAL FIELD

This invention relates to processing audio signals during a communication session.

BACKGROUND

Communication systems allow users to communicate with each other over a network. The network may be, for example, the interne or the Public Switched Telephone Network (PSTN). Audio signals can be transmitted between nodes of the network, to thereby allow users to transmit and receive audio data (such as speech data) to each other in a communication session over the communication system.

A user device may have audio input means such as a microphone that can be used to receive audio signals, such as speech from a user. The user may enter into a communication session with another user, such as a private call (with just two users in the call) or a conference call (with more than two users in the call). The user's speech is received at the microphone, processed and is then transmitted over a network to the other user(s) in the call.

As well as the audio signals from the user, the microphone may also receive other audio signals, such as background noise, which may disturb the audio signals received from the user.

The user device may also have audio output means such as speakers for outputting audio signals to the user that are received over the network from the user(s) during the call. However, the speakers may also be used to output audio signals from other applications which are executed at the user device. For example, the user device may be a TV, which executes an application such as a communication client for communicating over the network. When the user device is engaging in a call, a microphone connected to the user device is intended to receive speech or other audio signals provided by the user intended for transmission to the other user(s) in the call. However, the microphone may pick up unwanted audio signals which are output from the speakers of the user device. The unwanted audio signals output from the user device may contribute to disturbance to the audio signal received at the microphone from the user for transmission in the call.

In order to improve the quality of the signal, such as for use in the call, it is desirable to suppress unwanted audio signals (the background noise and the unwanted audio signals output from the user device) that are received at the audio input means of the user device.

The use of stereo microphones and microphone arrays in which a plurality of microphones operate as a single device are becoming more common. These enable use of extracted spatial information in addition to what can be achieved in a single microphone. When using such devices one approach to suppress unwanted audio signals is to apply a beamformer. Beamforming is the process of trying to focus the signals received by the microphone array by applying signal processing to enhance sounds coming from one or more desired directions. For simplicity we will describe the case with only a single desired direction in the following, but the same method will apply when there are more directions of interest. The beamforming is achieved by first estimating the angle from which wanted signals are received at the microphone, so-called Direction of Arrival ("DOA") information. Adaptive beamformers use the DOA information to filter the signals from the microphones in an array to form a beam that has a high gain in the direction from which wanted signals are received at the microphone array and a low gain in any other direction.

While the beamformer will attempt to suppress the unwanted audio signals coming from unwanted directions, the number of microphones as well as the shape and the size of the microphone array will limit the effect of the beamformer, and as a result the unwanted audio signals suppressed, but remain audible.

For subsequent single channel processing, the output of the beamformer is commonly supplied to single channel noise reduction stage as an input signal. Various methods of implementing single channel noise reduction have previously been proposed. A large majority of the single channel noise reduction methods in use are variants of spectral subtraction methods.

The spectral subtraction method attempts to separate noise from a speech plus noise signal. Spectral subtraction involves computing the power spectrum of a speech-plus-noise signal and obtaining an estimate of the noise spectrum. The power spectrum of the speech-plus-noise signal is compared with the estimated noise spectrum. The noise reduction can for example be implemented by subtracting the magnitude of the noise spectrum from the magnitude of the speech plus noise spectrum. If the speech-plus-noise signal has a high Signal-plus-Noise to Noise Ratio (SNNR) only very little noise reduction is applied. However if the speech-plus-noise signal has a low SNNR the noise reduction will significantly reduce the noise energy.

SUMMARY

A problem with spectral subtraction is that it often distorts the speech and results in temporally and spectrally fluctuating gain changes leading to the appearance of a type of residual noise often referred to as musical tones, which may affect the transmitted speech quality in the call. Varying degrees of this problem also occur in the other known methods of implementing single channel noise reduction.

According to a first aspect of the invention there is provided a method of processing audio signals during a communication session between a user device and a remote node, the method comprising: receiving a plurality of audio signals at audio input means at the user device including at least one primary audio signal and unwanted signals; receiving direction of arrival information of the audio signals at a noise suppression means; providing to the noise suppression means known direction of arrival information representative of at least some of said unwanted signals; and processing the audio signals at the noise suppression means to treat as noise, portions of the signal identified as unwanted dependent on a comparison between the direction of arrival information of the audio signals and the known direction of arrival information.

Preferably, the audio input means comprises a beamformer arranged to: estimate at least one principal direction from which the at least one primary audio signal is received at the audio input means; and process the plurality of audio signals to generate a single channel audio output signal by forming a beam in the at least one principal direction and substantially suppressing audio signals from any direction other than the principal direction.

Preferably, the single channel audio output signal comprises a sequence of frames, the noise suppression means processing each of said frames in sequence.

Preferably, direction of arrival information for a principal signal component of a current frame being processed is received at the noise suppression means, the method further comprising: comparing the direction of arrival of information for the principal signal component of the current frame and the known direction of arrival information.

The known direction of arrival information includes at least one direction from which far-end signals are received at the audio input means. Alternatively, or additionally, the known direction of arrival information includes at least one classified direction, the at least one classified direction being a direction from which at least one unwanted audio signal arrives at the audio input means and is identified based on the signal characteristics of the at least one unwanted audio signal. Alternatively, or additionally, the known direction of arrival information includes at least one principal direction from which the at least one primary audio signal is received at the audio input means. Alternatively, or additionally, the known direction of arrival information further includes the beam pattern of the beamformer.

In one embodiment, the method further comprises: determining whether the principal signal component of the current frame is an unwanted signal based on said comparison; and applying maximum attenuation to the current frame being processed if it is determined that the principal signal component of the current frame is an unwanted signal. The principal signal component of the current frame may be determined to be an unwanted signal if: the principal signal component is received at the audio input means from the at least one direction from which far-end signals are received at the audio input means; or the principal signal component is received at the audio input means from the at least one classified direction; or the principal signal component is not received at the audio input means from the at least one principal direction.

The method may further comprise: receiving the plurality of audio signals and information on the at least one principal direction at signal processing means; processing the plurality of audio signals at the signal processing means using said information on the at least one principal direction to provide additional information to the noise suppression means; and applying a level of attenuation to the current frame being processed at the noise suppression means in dependence on said additional information and said comparison.

Alternatively, the method may further comprise: receiving the single channel audio output signal and information on the at least one principal direction at signal processing means; processing the single channel audio output signal at the signal processing means using said information on the at least one principal direction to provide additional information to the noise suppression means; and applying a level of attenuation to the current frame being processed at the noise suppression means in dependence on said additional information and said comparison.

The additional information may include: an indication on the desirability of the principal signal component of the current frame, or a power level of the principal signal component of the current frame relative to an average power level of the at least one primary audio signal, or a signal classification of the principal signal component of the current frame, or at least one direction from which the principal signal component of the current frame is received at the audio input means.

Preferably, the at least one principal direction is determined by: determining a time delay that maximises the cross-correlation between the audio signals being received at the audio input means; and detecting speech characteristics in the audio signals received at the audio input means with said time delay of maximum cross-correlation.

Preferably, audio data received at the user device from the remote node in the communication session is output from audio output means of the user device.

The unwanted signals may be generated by a source at the user device, said source comprising at least one of: audio output means of the user device; a source of activity at the user device wherein said activity includes clicking activity comprising button clicking activity, keyboard clicking activity, and mouse clicking activity. Alternatively, the unwanted signals are generated by a source external to the user device.

Preferably, the at least one primary audio signal is a speech signal received at the audio input means.

According to a second aspect of the invention there is provided user device for processing audio signals during a communication session between a user device and a remote node, the user terminal comprising: audio input means for receiving a plurality of audio signals including a at least one primary audio signal and unwanted signals; and noise suppression means for receiving direction of arrival information of the audio signals and known direction of arrival information representative of at least some of said unwanted signals, the noise suppression means configured to process the audio signals by treating as noise, portions of the signal identified as unwanted dependent on a comparison between the direction of arrival information of the audio signals and the known direction of arrival information.

According to a third aspect of the invention there is provided a computer program product comprising computer readable instructions for execution by computer processing means at a user device for processing audio signals during a communication session between the user device and a remote node, the instructions comprising instructions for carrying out the method according to the first aspect of the invention.

In the following described embodiments, direction of arrival information is used to refine the decision of how much suppression to apply in subsequent single channel noise reduction methods. As most single channel noise reduction methods have a maximum suppression factor that is applied to the input signal to ensure a natural sounding but attenuated background noise, the direction of arrival information will be used to ensure that the maximum suppression factor is applied when the sound is arriving from any other angle than what the beamformer focuses on. For example, in the case of a TV playing out, maybe with a lowered volume, through the same speakers as are used for playing out the far end speech, a problem is that the output will be picked up by the microphone. With described embodiments of the present invention, it would be detected that the audio is arriving from the angle of the speakers and a maximum noise reduction would be applied in addition to the attempted suppression by the beamformer. As a result, the undesired signal would be less audible and therefore less disturbing to the far end speaker, and due to the reduced energy it would lower the average bit rate used for transmitting the signal to the far end.

BRIEF DESCRIPTION OF THE DRAWINGS

For a better understanding of the present invention and to show how the same may be put into effect, reference will now be made, by way of example, to the following drawings in which.

DETAILED DESCRIPTION

The teachings of all patents, published applications and references cited herein are incorporated by reference in their entirety.

In the following embodiments of the invention, a technique is described in which, instead of fully relying on the beamformer to attenuate sounds that are not coming from the direction of focus, using the DOA information in the subsequent single channel noise reduction method ensures maximum single channel noise suppression of sounds from any other direction than the ones the beamformer is focussed on. This is a significant advantage when the undesired signal can be distinguished from the desired nearend speech signal by using spatial information. Examples of such sources are loudspeakers playing music, fans blowing, and doors closing.

By using signal classification the direction of other sources can also be found. Examples of such sources could be, e.g. cooling fans/air conditioning systems, music playing in the background, and keyboard taps.

Two approaches can be taken: Firstly, undesired sources that are arriving from certain directions can be identified and the angles excluded from the angles where a noise suppression gain higher than the one used for maximum suppression is allowed. It would for example be possible to ensure that segments of audio from a certain undesired direction are scaled down as if the signal contained only noise. In practice the noise estimate can be set equal to the input signal for such a segment and consequently the noise reduction method would then apply maximum attenuation.

Secondly, noise reduction can be made less sensitive to speech in any other direction than the ones where we expect nearend speech to arrive from. That is, when calculating the gains to apply to the noisy signal as a function of the signal-plus-noise to noise ratio, the gain as a function of signal-plus-noise to noise ratio would also depend on how desired we consider the angle of the incoming speech to be. For desired directions the gain as a function of a given signal-plus-noise to noise ratio would be higher than for a less desired direction. The second method would ensure that we do not adjust based on moving noise sources which do not arrive from the same direction as the primary speaker(s), and which also have not been detected to be a source of noise.

Embodiments of the invention are particularly relevant in monophonic sound reproduction (often referred to as mono) applications with a single channel Noise reduction in stereo applications (where there is two or more independent audio channels) is not typically carried out by independent single channel noise reduction methods, but rather by a method which ensures that the stereo image is not distorted by the noise reduction method.

Figure 1:
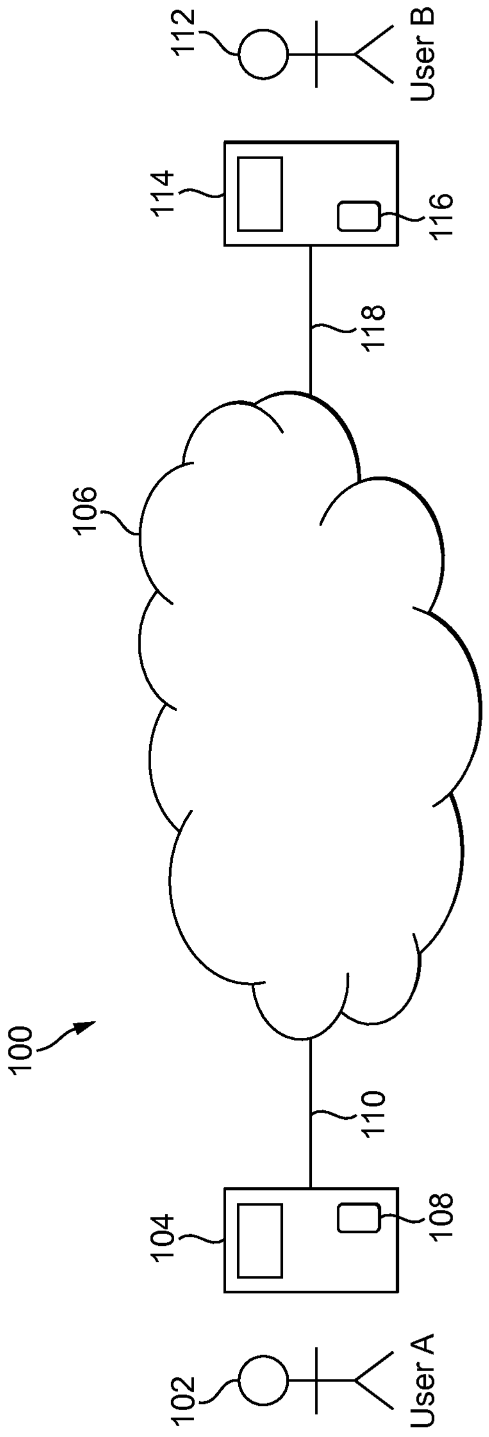
FIG. 1 shows a communication system according to a preferred embodiment.

Reference is first made to FIG. 1, which illustrates a communication system 100 of a preferred embodiment. A first user of the communication system (User A 102) operates a user device 104. The user device 104 may be, for example a mobile phone, a television, a personal digital assistant ("PDA"), a personal computer ("PC") (including, for example, Windows™, Mac OS™ and Linux™ PCs), a gaming device or other embedded device able to communicate over the communication system 100.

The user device 104 comprises a central processing unit (CPU) 108 which may be configured to execute an application such as a communication client for communicating over the communication system 100. The application allows the user device 104 to engage in calls and other communication sessions (e.g. instant messaging communication sessions) over the communication system 100. The user device 104 can communicate over the communication system 100 via a network 106, which may be, for example, the Internet or the Public Switched Telephone Network (PSTN). The user device 104 can transmit data to, and receive data from, the network 106 over the link 110.

FIG. 1 also shows a remote node with which the user device 104 can communicate over the communication system 100. In the example shown in FIG. 1, the remote node is a second user device 114 which is usable by a second user 112 and which comprises a CPU 116 which can execute an application (e.g. a communication client) in order to communicate over the communication network 106 in the same way that the user device 104 communicates over the communications network 106 in the communication system 100. The user device 114 may be, for example a mobile phone, a television, a personal digital assistant ("PDA"), a personal computer ("PC") (including, for example, Windows™, Mac OS™ and Linux™ PCs), a gaming device or other embedded device able to communicate over the communication system 100. The user device 114 can transmit data to, and receive data from, the network 106 over the link 118. Therefore User A 102 and User B 112 can communicate with each other over the communications network 106.

Figure 2:
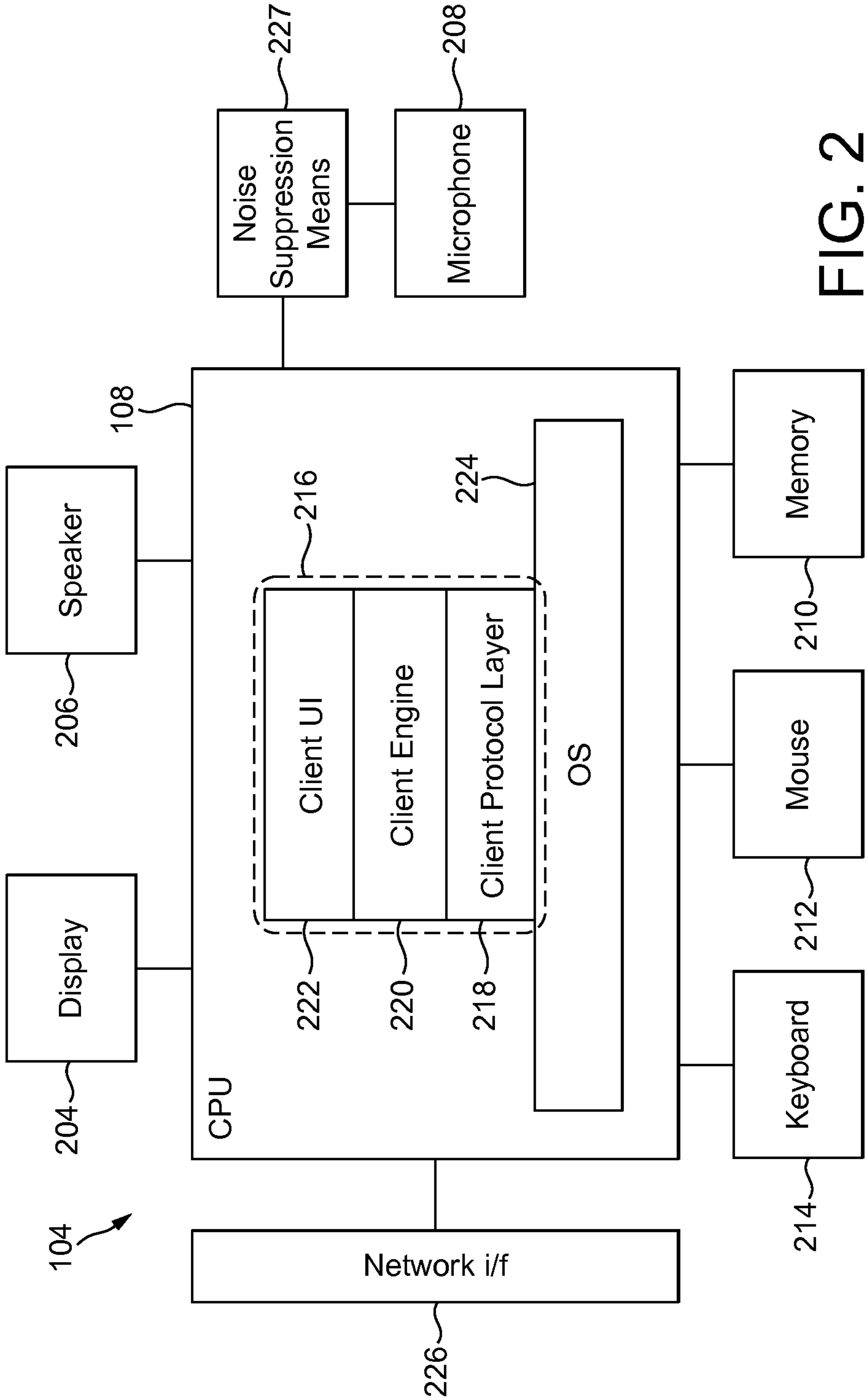
FIG. 2 shows a schematic view of a user terminal according to a preferred embodiment.

FIG. 2 illustrates a schematic view of the user terminal 104 on which is executed the client. The user terminal 104 comprises a CPU 108, to which is connected a display 204 such as a screen, memory 210, input devices such as keyboard 214 and a pointing device such as mouse 212. The display 204 may comprise a touch screen for inputting data to the CPU 108. An output audio device 206 (e.g. a speaker) is connected to the CPU 108. An input audio device such as microphone 208 is connected to the CPU 108 via noise suppression means 227. Although the noise suppression means 227 is represented in FIG. 2 as a stand alone hardware device, the noise suppression means 227 could be implemented in software. For example the noise suppression means 227 could be included in the client.

The CPU 108 is connected to a network interface 226 such as a modem for communication with the network 106.

Figure 3:
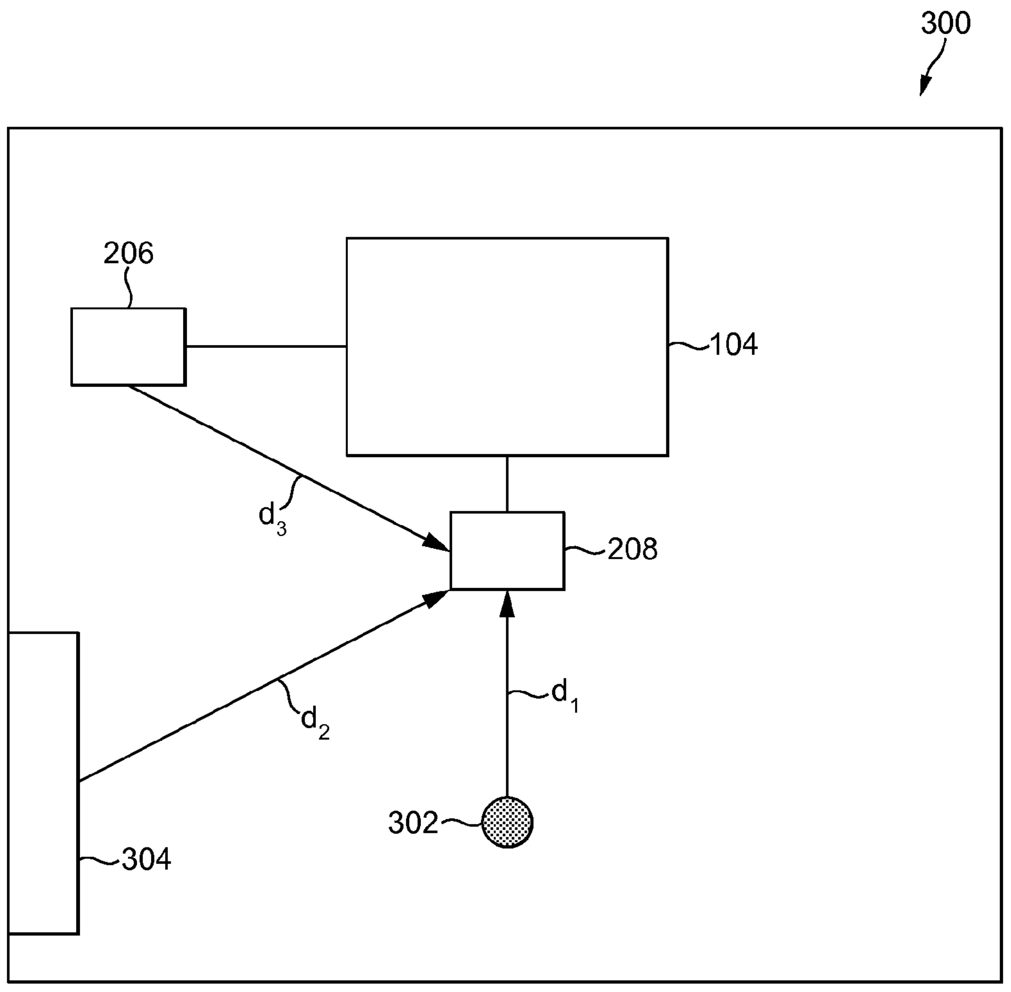
FIG. 3 shows an example environment of the user terminal.

Reference is now made to FIG. 3, which illustrates an example environment 300 of the user terminal 104.

Desired audio signals are identified when the audio signals are processed having been received at the microphone 208. During processing, desired audio signals are identified based on the detection of speech like qualities and a principal direction of a main speaker is determined. This is shown in FIG. 3 where the main speaker (user 102) is shown as a source 302 of desired audio signals that arrives at the microphone 208 from a principal direction d1. Whilst a single main speaker is shown in FIG. 3 for simplicity, it will be appreciated that any number of sources of wanted audio signals may be present in the environment 300.

Sources of unwanted noise signals may be present in the environment 300. FIG. 3 shows a noise source 304 of an unwanted noise signal in the environment 300 that may arrive at the microphone 208 from a direction d2. Sources of unwanted noise signals include for example cooling fans, air-conditioning systems, and a device playing music.

Unwanted noise signals may also arrive at the microphone 208 from a noise source at the user terminal 104 for example clicking of the mouse 212, tapping of the keyboard 214, and audio signals output from the speaker 206. FIG. 3 shows the user terminal 104 connected to microphone 208 and speaker 206. In FIG. 3, the speaker 206 is a source of an unwanted audio signal that may arrive at the microphone 208 from a direction d3.

Whilst the microphone 208 and speaker 206 have been shown as external devices connected to the user terminal it will be appreciated that microphone 208 and speaker 206 may be integrated into the user terminal 104.

Figure 4:
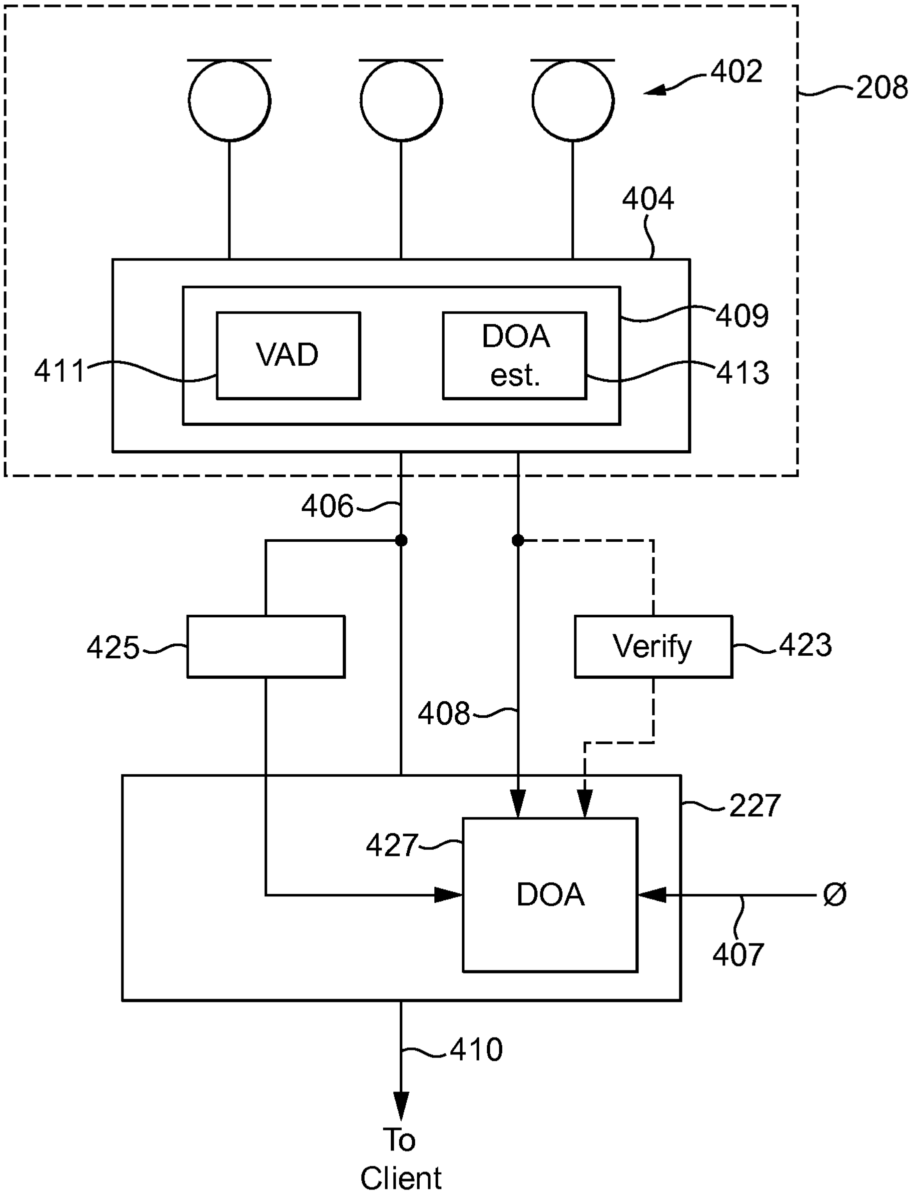
FIG. 4 shows a schematic diagram of audio input means at the user terminal according to one embodiment.

Reference is now made to FIG. 4 which illustrates a more detailed view of microphone 208 and the noise suppression means 227 according to one embodiment.

Microphone 208 includes a microphone array 402 comprising a plurality of microphones, and a beamformer 404. The output of each microphone in the microphone array 402 is coupled to the beamformer 404. Persons skilled in the art will appreciate that to implement beamforming multiple inputs are needed. The microphone array 402 is shown in FIG. 4 as having three microphones, it will be understood that this number of microphones is merely an example and is not limiting in any way.

The beamformer 404 includes a processing block 409 which receives the audio signals from the microphone array 402. Processing block 409 includes a voice activity detector (VAD) 411 and a DOA estimation block 413 (the operation of which will be described later). The processing block 409 ascertains the nature of the audio signals received by the microphone array 402, and based on detection of speech like qualities detected by the VAD 411 and DOA information estimated in block 413, one or more principal direction(s) of main speaker(s) is determined. The beamformer 404 uses the DOA information to process the audio signals by forming a beam that has a high gain in the direction from the one or more principal direction(s) from which wanted signals are received at the microphone array and a low gain in any other direction. Whilst it has been described above that the processing block 409 can determine any number of principal directions, the number of principal directions determined affects the properties of the beamformer e.g. less attenuation of the signals received at the microphone array from the other (unwanted) directions than if only a single principal direction is determined. The output of the beamformer 404 is provided on line 406 in the form of a single channel to be processed to the noise reduction stage 227 and then to an automatic gain control means (not shown in FIG. 4).

Preferably, the noise suppression is applied to the output of the beamformer before the level of gain is applied by the automatic gain control means. This is because the noise suppression could theoretically slightly reduce the speech level (unintentionally) and the automatic gain control means would increase the speech level after the noise suppression and compensate for the slight reduction in speech level caused by the noise suppression.

DOA information estimated in the beamformer 404 is supplied to the noise reduction stage 227 and to signal processing circuitry 420.

The DOA information estimated in the beamformer 404 may also be supplied to the automatic gain control means. The automatic gain control means applies a level of gain to the output of the noise reduction stage 227. The level of gain applied to the channel output from the noise reduction stage 227 depends on the DOA information that is received at the automatic gain control means. The operation of the automatic gain control means is described in British Patent Application No. 1108885.3 and will not be discussed in further detail herein.

The noise reduction stage 227 applies noise reduction to the single channel signal. The noise reduction can be carried out in a number of different ways including by way of example only, spectral subtraction (for example, as described in the paper "Suppression of acoustic noise in speech using spectral subtraction" by Boll, S in Acoustics, Speech and Signal Processing, IEEE Transactions on, April 1979, Volume 27, issue 2, pages 113-120).

This technique (as well as other known techniques) suppress components of the signal identified as noise so as to increase the signal-to-noise ratio, where the signal is the intended useful signal, such as speech in this case.

As described in more detail later, the direction of arrival information is used in the noise reduction stage to improve noise reduction and therefore enhance the quality of the signal.

The operation of DOA estimation block 413 will now be described in more detail with reference to FIG. 5.

In the DOA estimation block 413, the DOA information is estimated by estimating the time delay e.g. using correlation methods, between received audio signals at a plurality of microphones, and estimating the source of the audio signal using the a priori knowledge about the location of the plurality of microphones.

Figure 5:
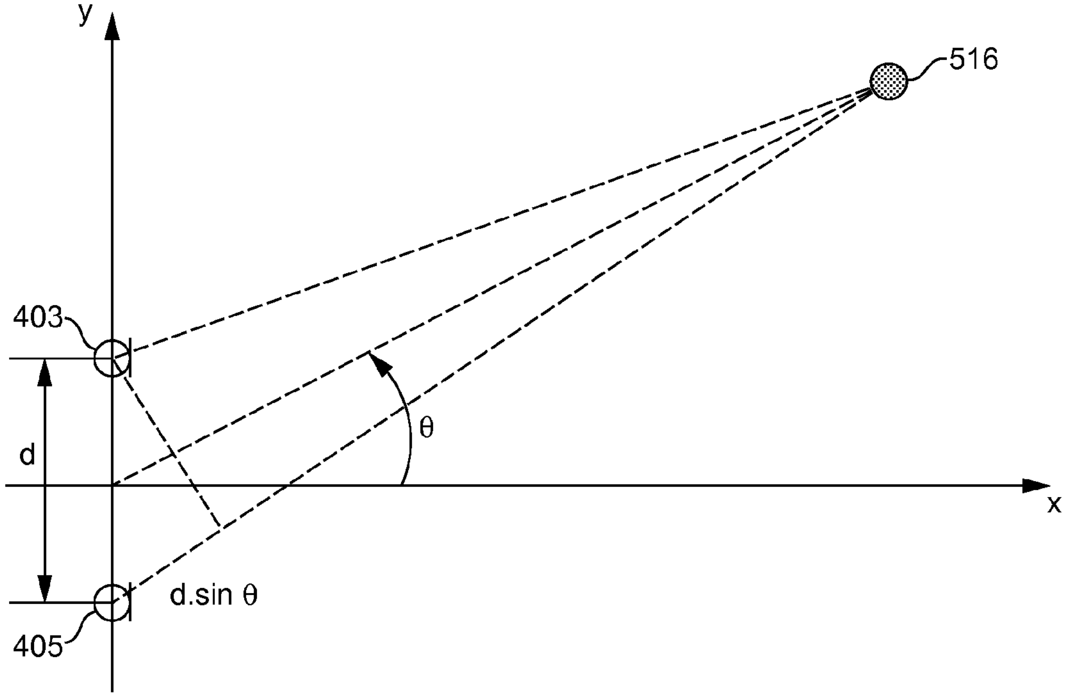
FIG. 5 shows a diagram representing how DOA information is estimated in one embodiment.

FIG. 5 shows microphones 403 and 405 receiving audio signals from an audio source 516. The direction of arrival of the audio signals at microphones 403 and 405 separated by a distance, d can be estimated using equation (1):

$$\theta = \arcsin\left(\frac{\tau_D v}{d}\right) \tag{1}$$

where v is the speed of sound, and $\tau_D$ is the difference between the times the audio signals from the source 516 arrive at the microphones 403 and 405—that is, the time delay. The time delay is obtained as the time lag that maximises the cross-correlation between the signals at the outputs of the microphones 403 and 405. The angle θ may then be found which corresponds to this time delay.

It will be appreciated that calculating a cross-correlation of signals is a common technique in the art of signal processing and will not be describe in more detail herein.

The operation of the noise reduction stage 227 will now be described in further detail below. In all embodiments of the invention the noise reduction stage 227 uses DOA information known at the user terminal and represented by DOA block 427 and receives an audio signal to be processed. The noise reduction stage 227 processes the audio signals on a per-frame basis. A frame can, for example, be between 5 and 20 milliseconds in length, and according to one noise suppression technique are divided into spectral bins, for example, between 64 and 256 bins per frame.

The processing performed in the noise reduction stage 227 comprises applying a level of noise suppression to each frame of the audio signal input to the noise reduction stage 227. The level of noise suppression applied by the noise reduction stage 227 to each frame of the audio signal depends on a comparison between the extracted DOA information of the current frame being processed, and the built up knowledge of DOA information for various audio sources known at the user terminal. The extracted DOA information is passed on alongside the frame, such that it is used as an input parameter to the noise reduction stage 227 in addition to the frame itself.

The level of noise suppression applied by the noise reduction stage 227 to the input audio signal may be affected by the DOA information in a number of ways.

Audio signals that arrive at the microphone 208 from directions which have been identified as from a wanted source may be identified based on the detection of speech like characteristics and identified as being from a principal direction of a main speaker.

The DOA information 427 known at the user terminal may include the beam pattern 408 of the beamformer. The noise reduction stage 227 processes the audio input signal on a per-frame basis. During processing of a frame, the noise reduction stage 227 reads the DOA information of a frame to find the angle from which a main component of the audio signal in the frame was received at the microphone 208. The DOA information of the frame is compared with the DOA information 427 known at the user terminal. This comparison determines whether a main component of the audio signal in the frame being processed was received at the microphone 208 from the direction of a wanted source.

Alternatively or additionally, the DOA information 427 known at the user terminal may include the angle Ø at which farend signals are received at the microphone 208 from speakers (such as 206) at the user terminal (supplied to the noise reduction stage 227 line 407).

Alternatively or additionally, the DOA information 427 known at the user terminal may be derived from a function 425 which classifies audio from different directions to locate a certain direction which is very noisy, possibly as a result of a fixed noise source.

When the DOA information 427 represents the principal wanted direction, and it is determined by comparison that a main component of the frame being processed is received at the microphone 208 from that principal direction. The noise reduction stage 227 determines a level of noise suppression using conventional methods described above.

In a first approach, if it is determined that a main component of the frame being processed is received at the microphone 208 from a direction other than a principal direction, the bins associated with the frame are all treated as though they are noise (even if a normal noise reduction technique would identify a good signal-plus-noise to noise ratio and thus not significantly suppress the noise). This may be done by setting the noise estimate equal to the input signal for such a frame and consequently the noise reduction stage would then apply maximum attenuation to the frame. In this way, frames arriving from directions other than the wanted direction can be suppressed as noise and the quality of the signal improved.

As mentioned above, the noise reduction stage 227 may receive DOA information from a function 425 which identifies unwanted audio signals arriving at the microphone 208 from noise source(s) in different directions. These unwanted audio signals are identified from their characteristics, for example audio signals from key taps on a keyboard or a fan have different characteristics to human speech. The angle at which the unwanted audio signals arrive at the microphone 208 may be excluded where a noise suppression gain higher than the one used for maximum suppression is allowed. Therefore when a main component of an audio signal in a frame being processed is received at the microphone 208 from an excluded direction the noise reduction stage 227 applies maximum attenuation to the frame.

A verification means 423 may be further included. For example, once one or more principal directions have been detected (based on the beam pattern 408 for example in the case of a beamformer), the client informs the user 102 of the detected principal direction via the client user interface and asks the user 102 if the detected principal direction is correct. This verification is optional as indicated by the dashed line in FIG. 4.

If the user 102 confirms that the detected principal direction is correct, then the detected principal direction is sent to the noise reduction stage 227 and the noise reduction stage 227 operates as described above. The communication client may store the detected principal direction in memory 210, once the user 102 logs in to the client and has confirmed that a detected principal direction is correct, following subsequent log-ins to the client if a detected principal direction matches a confirmed correct principal direction in memory the detected principal direction is taken to be correct. This prevents the user 102 having to confirm a principal direction every time he logs into the client.

If the user indicates that the detected principal direction is incorrect, then the detected principal direction is not sent as DOA information to the noise reduction stage 227. In this case, the correlation based method (described above with reference to FIG. 5) will continue to detect the principal direction and will only send the detected one or more principal directions once the user 102 confirms that the detected principal direction is correct.

In the first approach, the mode of operation is such that maximum attenuation can be applied to a frame being processed based on DOA information of the frame.

In a second approach, the noise reduction stage 227 does not operate in such a strict mode of operation.

In the second approach, when calculating the gains to apply to the audio signal in the frame as a function of the signal-plus-noise to noise ratio, the gain as a function of signal-plus-noise to noise ratio depends on additional information. This additional information can be calculated in a signal processing block (not shown in FIG. 4).

In a first implementation the signal processing block may be implemented in the microphone 208. The signal processing block receives as an input the far-end audio signals from the microphone array 402 (before the audio signals have been applied to the beamformer 404), and also receives the information on the principal direction(s) obtained from the correlation method. In this implementation, the signal processing block outputs the additional information to the noise reduction stage 227.

In a second implementation the signal processing block may be implemented in the noise reduction stage 227 itself. The signal processing block receives as an input the single channel output signal from the beamformer 404, and also receives the information on the principal direction(s) obtained from the correlation method. In this implementation the noise reduction stage 227 may receive information indicating that the speakers 206 are active and can ensure that the principal signal component in the frame being processed is handled as noise only, provided that it is different from the angle of desired speech.

In both implementations the additional information calculated in the signal processing block is used by the noise reduction stage 227 to calculate the gain to apply to the audio signal in the frame being processed as a function of the signal-plus-noise to noise ratio.

The additional information may include for example the likelihood that desired speech will arrive from a particular direction/angle.

In this scenario the signal processing block provides, as an output, a value that indicates how likely the frame currently being processed by the noise reduction stage 277, contains a desired component that the noise reduction stage should preserve. The signal processing block quantifies the desirability of angles from which incoming speech is received at the microphone 208. For example if audio signals are received at the microphone 208 during echo, the angle at which these audio signals are received at the microphone 208 is likely to be an undesired angle since it is not desirable to preserve any far-end signals received from speakers (such as 206) at the user terminal.

In this scenario, the noise suppression gain as a function of signal-plus-noise to noise ratio applied to the frame by the noise reduction stage 227 is dependent on this quantified measure of desirability. For desired directions the gain as a function of a given signal-plus-noise to noise ratio would be higher than for a less desired direction i.e. less attenuation is applied by the noise reduction stage 227 for more desired directions.

The additional information may alternatively include the power of the principal signal component of the current frame relative to the average power of the audio signals received from the desired direction(s). In this scenario, the noise suppression gain as a function of signal-plus-noise to noise ratio applied to the frame by the noise reduction stage 227 is dependent on this quantified power ratio. The closer the power of the principal signal component is relative to the average power from the principal directions, the higher the gain as a function of a given signal-plus-noise to noise ratio applied by the noise reduction stage 227 i.e. less attenuation is applied.

The additional information may alternatively be a signal classifier output providing a signal classification of the principal signal component of the current frame. In this scenario, the noise reduction stage 227 may apply varying levels of attenuation to a frame wherein the main component of the frame is received at the microphone array 402 from a particular direction in dependence on the signal classifier output. Therefore if an angle is determined to be a non-desired direction, the noise reduction stage 227 may reduce noise from the non-desired direction more than speech from the same non-desired direction. This is possible and indeed practical if desired speech is expected to arrive from the non-desired direction. However, it has the major drawback that the noise will be modulated, i.e. the noise will be higher when the desired speaker is active, and the noise will be lower when an undesired speaker is active. Instead, it is preferable to slightly reduce the level of speech in signals from this direction. If not handling it exactly as noise by making sure to apply the same amount of attenuation, then by handling it as somewhere in between desired speech and noise. This can be achieved by using a slightly different attenuation function for non-desired directions.

The additional information may alternatively be the angle itself from which the principal signal component of the current frame is received at the audio input means. i.e. Ø supplied to the noise reduction stage 227 on line 407. This enables the noise reduction stage to apply more attenuation as the audio source moves away from the principal direction(s).

In this second approach, more granularity is provided as the noise reduction stage 227 is able to operate in between the two extremes of handling a frame as noise only and as traditionally done in single-channel noise reduction methods. Therefore the noise reduction stage 227 can be made slightly more aggressive for audio signals arriving from undesired directions without handling it fully as if it was nothing but noise. That is, aggressive in the in the sense that we for example will apply some attenuation to the speech signal.

Whilst the embodiments described above have referred to a microphone 208 receiving audio signals from a single user 102, it will be understood that the microphone may receive audio signals from a plurality of users, for example in a conference call. In this scenario multiple sources of wanted audio signals arrive at the microphone 208.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with reference to preferred embodiments, it will be understood to those skilled in the art that various changes in form and detail may be made without departing from the scope of the invention as defined by the appendant claims.

What is claimed is:

1. A method of processing audio signals during a communication session between a user device and a remote node, the method comprising:

receiving a plurality of audio signals at the user device, the plurality of audio signals including at least one primary audio signal and unwanted signals;

receiving direction of arrival information of the audio signals at a noise reduction stage;

querying the user device for stored known direction of arrival information stored from one or more prior communication sessions;

providing to the noise reduction stage known direction of arrival information representative of at least some of said unwanted signals;

estimating at least one principal direction from which the at least one primary audio signal is received at a beamformer at the user device;

processing the plurality of audio signals to generate a single channel audio output signal comprising a sequence of frames, the noise reduction stage processing each of said frames in sequence;

comparing the direction of arrival information for a principal signal component of the current frame being processed with the known direction of arrival information;

determining whether the principal signal component of the current frame is an unwanted signal based on said comparison; and responsive to determining that the principal signal component of the current frame is an unwanted signal based on direction of arrival information, applying maximum attenuation to the entire current frame.

2. The method according to claim 1, wherein the known direction of arrival information includes at least one direction from which far-end signals are received at the beamformer.

3. The method according to claim 1, wherein the known direction of arrival information includes at least one classified direction, the at least one classified direction being a direction from which at least one unwanted audio signal arrives at the beamformer and is identified based on the signal characteristics of the at least one unwanted audio signal.

4. The method according to claim 1, wherein the known direction of arrival information includes at least one principal direction from which the at least one primary audio signal is received at the beamformer.

5. The method according to claim 1, wherein the beamformer processes the plurality of audio signals to generate the single channel audio output signal, and the known direction of arrival information further includes the beam pattern of the beamformer.

6. The method according to claim 1, further comprising determining that the principal signal component of the current frame is an unwanted signal if:

the principal signal component is received at the beamformer from at least one direction from which far-end signals are received at the beamformer;

the principal signal component is received at the beamformer from at least one classified direction; or the principal signal component is not received at the beamformer from at least one principal direction.

7. The method according to claim 1, further comprising:

receiving the plurality of audio signals and information on the at least one principal direction at signal processing circuitry;

processing the plurality of audio signals at the signal processing circuitry using said information on the at least one principal direction to provide additional information to the noise reduction stage; and applying a level of attenuation to the current frame being processed at the noise reduction stage in dependence on said additional information and said comparison.

8. The method according to claim 7, wherein the additional information includes an indication on the desirability of the principal signal component of the current frame.

9. The method according to claim 7, wherein the additional information includes a power level of the principal signal component of the current frame relative to an average power level of the at least one primary audio signal.

10. The method according to claim 7, wherein the additional information includes a signal classification of the principal signal component of the current frame.

11. The method according to claim 7, wherein the additional information includes at least one direction from which the principal signal component of the current frame is received at the beamformer.

12. The method according to claim 1, further comprising:

receiving the single channel audio output signal and information on the at least one principal direction at signal processing circuitry;

processing the single channel audio output signal at the signal processing circuitry using said information on the at least one principal direction to provide additional information to the noise reduction stage; and applying a level of attenuation to the current frame being processed at the noise reduction stage in dependence on said additional information and said comparison.

13. A user device for processing audio signals during a communication session between the user device and a remote node, the user device comprising:

a beamformer configured to:

receive a plurality of audio signals including at least one primary audio signal and unwanted signals; and generate, from the plurality of audio signals, a single channel audio output signal including a plurality of frames; and a noise reduction stage configured to:

receive direction of arrival information for the plurality of audio signals and known direction of arrival information representative of at least some of said unwanted signals in the single channel audio output signal;

process the single channel audio output signal by treating as noise, portions of the signal identified as unwanted dependent on a comparison between the direction of arrival information of the plurality of audio signals in the single channel audio output signal and the known direction of arrival information; and process the single channel audio output signal by applying varying levels of attenuation to respective different signals in a single frame of the plurality of frames.

14. The user device according to claim 13, wherein the beamformer is further configured to:

estimate at least one principal direction from which the at least one primary audio signal arrives; and process the plurality of audio signals to generate a single channel audio output signal by forming a beam in the at least one principal direction and substantially suppressing audio signals from any direction other than the principal direction.

15. The user device according to claim 14, wherein the at least one principal direction is determined by:

determining a time delay that maximizes the cross-correlation between the audio signals being received at the beamformer; and detecting speech characteristics in the audio signals received at the beamformer with said time delay of maximum cross-correlation.

16. The user device according to claim 13, wherein the noise reduction stage is configured to output audio data received at the user device from the remote node in the communication session.

17. The user device according to claim 13, wherein the unwanted signals are generated by a source at the user device, said source comprising at least one of: audio output means of the user device; a source of activity at the user device wherein said activity includes clicking activity comprising button clicking activity, keyboard clicking activity, and mouse clicking activity.

18. The user device according to claim 13, wherein the unwanted signals are generated by a source external to the user device.

19. The user device according to claim 13, wherein the at least one primary audio signal is a speech signal received at the beamformer.

20. A computer program product comprising computer readable instructions stored on a computer readable medium, the instructions executable for execution by one or more computer processors at a user device to perform operations comprising:

processing a plurality of audio signals including at least one primary audio signal and unwanted signals during a communication session between the user device and a remote node;

receiving direction of arrival information of the plurality of audio signals;

detecting one or more principal directions from the received direction of arrival information;

informing a user of the user device of the detected one or more principal directions;

responsive to said informing, prompting the user of the user device to verify that the one or more detected principal directions from the received direction of arrival information are correct principal directions;

providing known direction of arrival information representative of at least some of said unwanted signals; and processing the audio signals to treat as noise, portions of the signal identified as unwanted dependent on a comparison between the direction of arrival information of the audio signals and the known direction of arrival information.

21. The method according to claim 20, wherein the known direction of arrival information includes at least one direction from which far-end signals are received at a beamformer of the user device.

22. A method of processing audio signals during a communication session between a user device and a remote node, the method comprising:

receiving a plurality of audio signals at the user device including at least one primary audio signal and unwanted signals;

receiving direction of arrival information of the plurality of audio signals;

providing known direction of arrival information representative of at least some of said unwanted signals;

detecting one or more principal directions from the received direction of arrival information;

informing a user of the user device of the detected one or more principal directions;

responsive to said informing, prompting the user of the user device to verify that the one or more detected principal directions from the received direction of arrival information are correct principal directions; and processing the audio signals to treat as noise, portions of the signal identified as unwanted dependent on the known direction of arrival information and the verified one or more detected principal directions.

23. The method according to claim 22, wherein the known direction of arrival information includes at least one direction from which far-end signals are received at a beamformer of the user device.

24. The method according to claim 23, wherein the known direction of arrival information includes at least one principal direction from which the at least one primary audio signal is received at the beamformer.

25. The method according to claim 23, wherein the known direction of arrival information includes at least one classified direction being a direction from which at least one unwanted audio signal arrives at the beamformer and identified based on signal characteristics of at least one unwanted audio signal.

* * * * *